United States Patent [19]

Dohi et al.

[11] Patent Number: 5,604,766
[45] Date of Patent: Feb. 18, 1997

[54] TRANSMISSION POWER CONTROL METHOD OF A SPREAD-SPECTRUM COMMUNICATION SYSTEM, AND A SPREAD-SPECTRUM COMMUNICATION SYSTEM EMPLOYING THE CONTROL METHOD

[75] Inventors: Tomohiro Dohi, Yokohama; Mamoru Sawahashi, Yokosuka; Fumiyuki Adachi, Yokohama, all of Japan

[73] Assignee: NTT Mobile Communications Network Inc., Tokyo, Japan

[21] Appl. No.: 439,503

[22] Filed: May 11, 1995

[30] Foreign Application Priority Data

May 12, 1994 [JP] Japan ..................... 6-098814
Apr. 3, 1995 [JP] Japan ..................... 7-077935

[51] Int. Cl.$^6$ ............... H04B 7/26; H04L 27/30
[52] U.S. Cl. ................ 375/200; 370/335; 455/69
[58] Field of Search ................... 375/200, 205; 370/18; 455/69

[56] References Cited

U.S. PATENT DOCUMENTS

| | | | |
|---|---|---|---|
| 5,056,109 | 10/1991 | Gilhousen et al. | 375/200 |
| 5,093,840 | 3/1992 | Schilling | 370/200 |
| 5,216,692 | 6/1993 | Ling | 375/200 |
| 5,245,629 | 9/1993 | Hall | 375/200 |
| 5,297,161 | 3/1994 | Ling | 375/200 |
| 5,305,468 | 4/1994 | Bruckert et al. | 455/69 |
| 5,383,219 | 1/1995 | Wheatley, III et al. | 375/205 |

FOREIGN PATENT DOCUMENTS

WO-A-
9221196  11/1992  WIPO.

*Primary Examiner*—Young T. Tse
*Attorney, Agent, or Firm*—Rogers & Wells

[57] ABSTRACT

A transmission power control method of a spread-spectrum communication system which determines transmission power in accordance with a transmission power control bit. The transmission power control bit is extracted at a base station from a signal sequence obtained by receiving a signal transmitted from a mobile station, and by despreading and demodulating the received signal. When the same value of the transmission power control bit is consecutively received, the transmission power of the base station is controlled in accordance with transmission power control quantities which are predetermined in accordance with the consecutive number of receptions of the same value of the transmission power control bit. This is because the consecutive receptions of the same value of the transmission power control bit suggests that the received power of the other party (the mobile station in this case) changes greatly. Thus, an amount of an increment or a decrement in the transmission power is increased with the duration of the consecutive receptions. This makes it possible for the transmission power control to follow sudden changes in propagation paths.

8 Claims, 7 Drawing Sheets

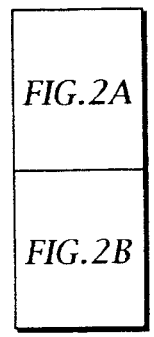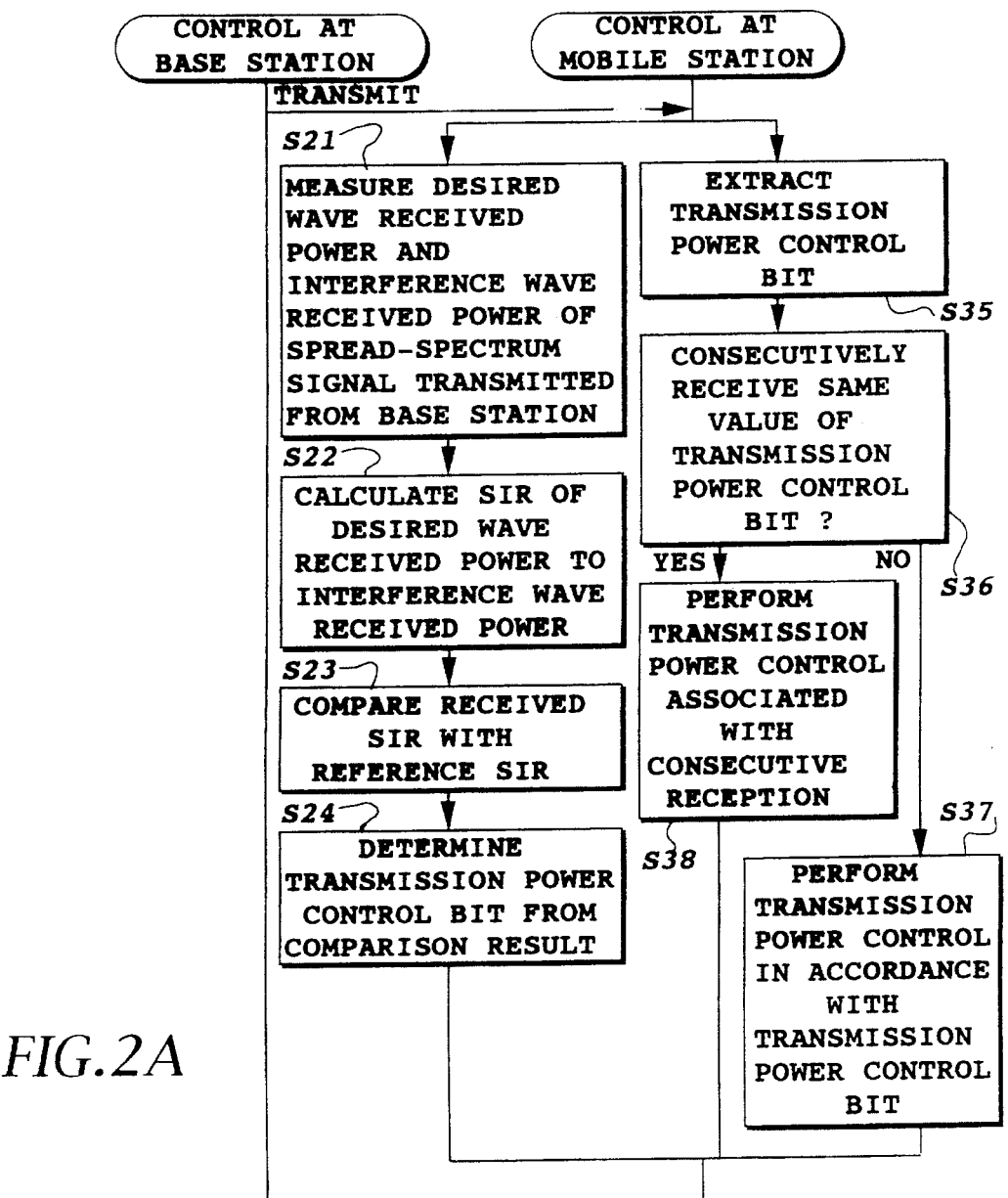

TRANSMISSION POWER CONTROL METHOD OF A SPREAD-SPECTRUM COMMUNICATION SYSTEM, AND A SPREAD-SPECTRUM COMMUNICATION SYSTEM EMPLOYING THE CONTROL METHOD

BACKGROUND OF THE INVENTION

1. Field of the Invention

The present invention relates to a transmission power control method of a spread-spectrum communication system, and a spread-spectrum communication system employing the control method, which can be preferably applied to the transmission power control in cellular CDMA (Code Division Multiple Access) systems in radio communications.

2. Description of Related Art

As is well known, since a plurality of users share the same frequency band in a CDMA system, signals from the other users interfere with the signal of a user, thereby degrading the communication quality of the user. In addition, when a first mobile station near a base station and a second mobile station faraway from the base station perform communications at the same time, a transmitted signal from the first mobile station will be received at higher power by the base station, and a transmitted signal from the second mobile station will be received at lower power.

Thus, a near-far problem arises in that channel quality will be greatly degraded in communications between a base station and faraway mobile stations owing to the interference from mobile stations near the base station. In view of this, transmission power control has been studied as a technique for overcoming the near-far problem. The transmission control is carried out by controlling transmission power in such a manner that the received power by a receiving station, or the SIR (Signal-to-Interference power Ratio) obtained from the received power is kept constant independently of the locations of a mobile station, thus providing uniform channel quality throughout the service area. In particular, in reverse (from mobile station to base station) channels, the transmission power control of respective mobile stations is performed such that the received power levels of signals transmitted from the mobile stations and received by the base station, or the SIRs associated with the received power levels are kept constant at the base station.

In particular, in the CDMA system which considers the interference from the other users as white noise, equivalent noise power increases with the number of users, and hence, the capacity in terms of the number of subscribers in the cell is determined on the basis of the received SIR which can maintain predetermined channel quality.

On the other hand, in forward (from base station to mobile station) channels, the received SIR is kept constant because the intended channel signal travels through the same propagation paths as the signals for the other users which cause the interference, and undergoes the same fluctuations as the interference waves, where the fluctuations include long-term, short-term, and instantaneous fluctuations. Therefore, the transmission power control is not required when handling only the interference in the same cell.

The CDMA system, which handles the interference as white noise, however, must take account of the interference from other cells because it shares the same frequency band with adjacent cells. Although the interference power from other cells takes a form of instantaneous fluctuations due to Rayleigh fading as the interference power in the same cell, the fluctuations differ from those of the desired signal. According to the CDMA system standard by TIA (Telecommunications Industry Association), no forward transmission power control is performed basically, except when a frame error rate at a base station exceeds a predetermined threshold level, in which case the transmission power of the base station to the mobile station is increased. This is because a large amount of transmission power change will increase the interference to other cells. The transmitted signals from the base stations of other cells, however, become instantaneously fluctuating interference to an intended channel, and this conventional system cannot follow the instantaneous fluctuations.

As a conventional transmission power control method which can track the instantaneous fluctuations, a transmission power control method based on a closed loop control using a transmission power control bit is known.

FIGS. 1A and 1B show examples of the transmission power control method based on the closed loop control. As shown in FIGS. 1A and 1B, when a mobile station performs communications with a base station within the cell, the mobile station measures the received power of the desired signal from the base station, and determines a transmission power control bit for controlling the transmission power of the base station on the basis of the measured result (steps S1–S4). The mobile station inserts the transmission power control bit into the signal to be transmitted, and transmits it to the base station. The base station receives the signal transmitted from the mobile station, extracts the transmission power control bit, and determines its transmission power in accordance with the transmission power control bit (steps S5 and S6).

Likewise, the base station measures the received power of the desired signal from the mobile station, and determines a transmission power control bit for controlling the transmission power of the mobile station on the basis of the measured result (steps S11–S14). Then, the base station inserts the transmission power control bit into the signal to be transmitted, and sends it to the mobile station. The mobile station receives the signal transmitted from the base station, extracts the transmission power control bit, and determines its transmission power in accordance with the transmission power control bit (steps S15 and S16).

According to the conventional closed loop transmission power control method described above in reference to FIGS. 1A and 1B, the insertion interval of the transmission power control bit must be shorter than the Doppler fluctuation period (=1/Doppler frequency) in order to absorb the instantaneous fluctuations due to Rayleigh fading. For example, when a carrier of 2 GHz band is used by a mobile station moving at 60 km/h–70 km/h, the Doppler frequency becomes about 200 Hz. Accordingly, the transmission power control bit must be inserted into a frame at every few millisecond interval.

On the other hand, taking account of frame efficiency (transmission efficiency), the number of transmission power control bits per transmission power control is limited to 1–2 bits. Furthermore, a controlled amount is usually set small to achieve a high accuracy transmission power control. Therefore, the conventional system cannot follow a sudden changes in the received power. In particular, since there are many high buildings in urban areas, the propagation path of a mobile station may suddenly be transferred from a shadow of a high building to a line of sight area, or vice versa. In such cases, the received signal level at the base station will vary by more than 30 dB.

In the case where the transmission power control in the reverse direction operates normally as described above, the base station received powers (or SIRs) of the signals transmitted from respective mobile stations become constant, and hence, uniform receiving quality can be obtained.

However, when a mobile station suddenly moves out of a shadow of a building to a line of sight area, the base station's received power of the signal transmitted from the mobile station suddenly increases, which induces large interference to signals transmitted from the other mobile stations. In such cases, the transmission power control bit of a small controlling quantity cannot quickly reduce the transmission power. This presents a problem in that large interference to the other users takes place, and the capacity in terms of the number of subscribers is reduced.

SUMMARY OF THE INVENTION

In view of this, a first object of the present invention is to provide a transmission power control method and a spread-spectrum communication system using the control method, which can achieve a large capacity of transmission power control in a short time without degrading the transmission efficiency.

A second object of the present invention is to provide a transmission power control method and a spread-spectrum communication system using the control method, which can achieve transmission at appropriate power in response to sudden changes in received power or received SIR caused by sudden changes in communication paths, which will take place when a mobile station comes out of a shadow of a building in a cellular mobile communications employing the CDMA system.

In a first aspect of the present invention, there is provided a transmission power control method which controls transmission power of a transmitting station by using a transmission power control bit sequentially sent from a receiving station to the transmitting station, the transmission power control method comprising the steps of:

storing in advance, at the transmitting station, control quantities of the transmission power of the transmitting station, which are predetermined in accordance with the number of consecutive receptions of the same value of the transmission power control bit;

sending the transmission power control bit sequentially from the receiving station to the transmitting station;

detecting, at the transmitting station, the number of consecutive receptions of the same value of the transmission power control bit sent from the receiving station; and controlling, at the transmitting station, the transmission power in accordance with the stored control quantities associated with the number of consecutive receptions of the same value of the transmission power control bit.

The step of sending the transmission power control bit may comprise the steps of:

detecting, at the receiving station, received power of a desired wave;

detecting, at the receiving station, received power of an interference wave;

calculating, at the receiving station, a received SIR (Signal-to-Interference Ratio) of the received power of a desired wave to the received power of an interference wave; and determining, at the receiving station, the transmission power control bit such that the received SIR becomes equal to a predetermined reference SIR.

The control quantities may be predetermined in accordance with the number of consecutive receptions when the value of the transmission power control bit is "0" which commands a decrement of the transmission power, and the control quantities are fixed when the value of the transmission power control bit is "1" which commands an increment of the transmission power.

The control quantities may be −1 dB, −3 dB, −4 dB, and −5 dB, when the number of consecutive receptions of "0" of the transmission power control bit is 2, 3, 4, and 5 or more, respectively.

In a second aspect of the resent invention, there is provided a spread-spectrum communication system which controls transmission power of a transmitting station by using a transmission power control bit sequentially sent from a receiving station to the transmitting station, the spread-spectrum communication system comprising:

means for storing in advance, at the transmitting station, control quantities of the transmission power of the transmitting station, which are predetermined in accordance with the number of consecutive receptions of the same value of the transmission power control bit;

means for sending the transmission power control bit sequentially from the receiving station to the transmitting station;

means for detecting, at the transmitting station, the number of consecutive receptions of the same value of the transmission power control bit sent from the receiving station; and means for controlling, at the transmitting station, the transmission power in accordance with the stored control quantities associated with the number of consecutive receptions of the same value of the transmission power control bit.

The means for sending may comprise:

means for detecting, at the receiving station, received power of a desired wave;

means for detecting, at the receiving station, received power of an interference wave;

means for calculating, at the receiving station, a received SIR (Signal-to-Interference Ratio) of the received power of a desired wave to the received power of an interference wave; and means for determining, at the receiving station, the transmission power control bit such that the received SIR becomes equal to a predetermined reference SIR.

The control quantities may be predetermined in accordance with the number of consecutive receptions when the value of the transmission power control bit is "0" which commands a decrement of the transmission power, and the control quantities are fixed when the value of the transmission power control bit is "1" which commands an increment of the transmission power.

The control quantities may be −1 dB, −3 dB, −4 dB, and −5 dB, when the number of consecutive receptions of "0" of the transmission power control bit is 2, 3, 4, and 5 or more, respectively.

According to the present invention, large changes in the received power of the opposite party is presumed when transmission power control bits of the same value are received consecutively. In this case, transmission power control is performed in accordance with controlled quantities of the transmission power, which are predetermined in accordance with the number of consecutive receptions of the same value of the transmission power control bits during the consecutive reception interval. Thus, an increment or a decrement of the transmission power is increased with the consecutive reception time, which makes it possible to follow sudden changes in the communication paths.

The above and other objects, effects, features and advantages of the present invention will become more apparent from the following description of the embodiment thereof taken in conjunction with the accompanying drawings.

BRIEF DESCRIPTION OF THE DRAWINGS

FIGS. 2, 2A and 2B are flowcharts showing the principle of a transmission power control method in accordance with the present invention;

DETAILED DESCRIPTION OF PREFERRED EMBODIMENT

The invention will now be described with reference to the accompanying drawings.

Figure 1:
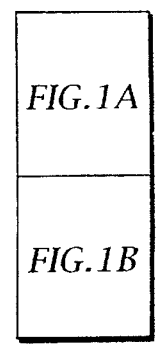
FIGS. 1, 1A and 1B are flowcharts explaining the principle of a conventional transmission power control method.
Figure 1A:
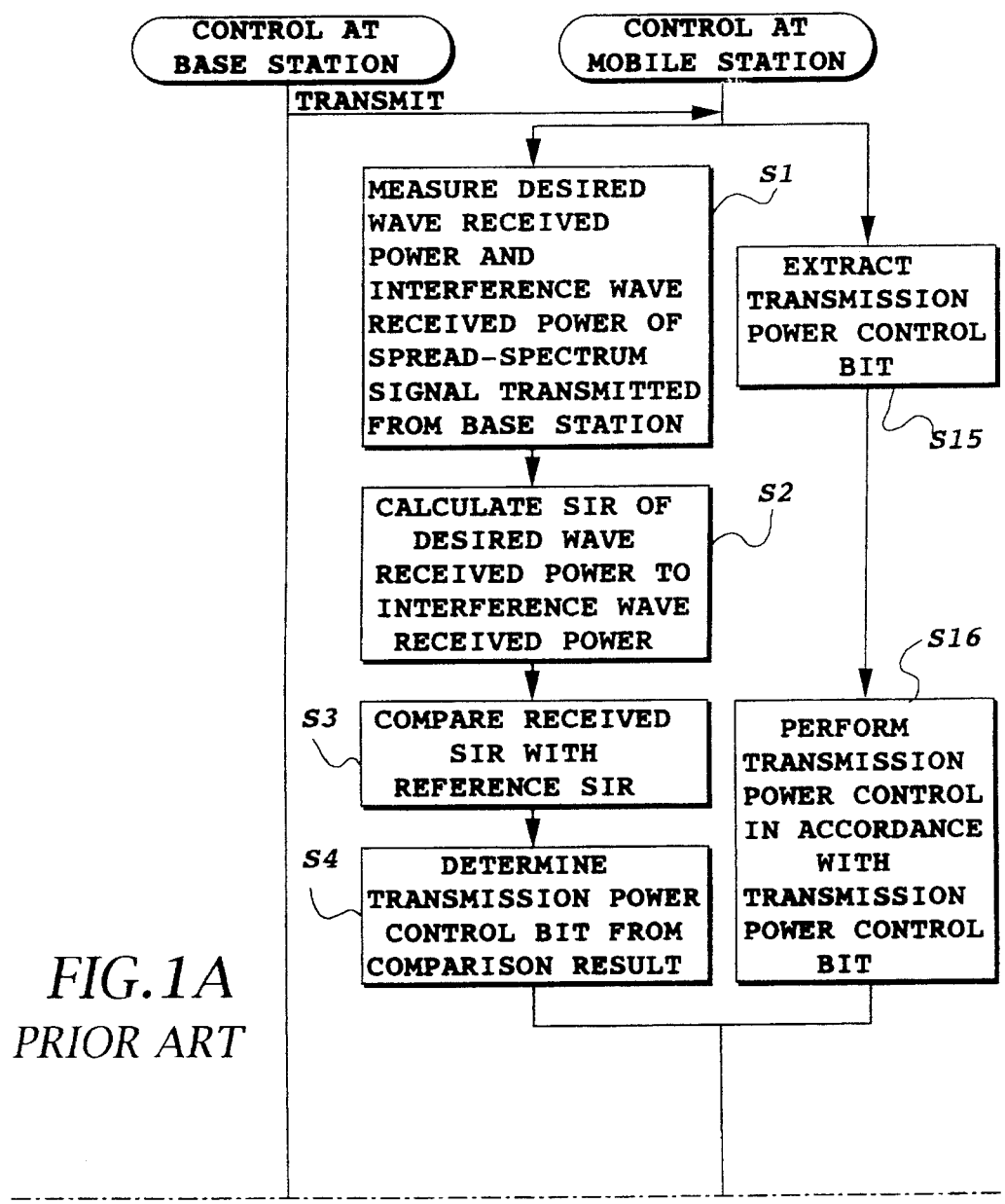
Figure 1B:
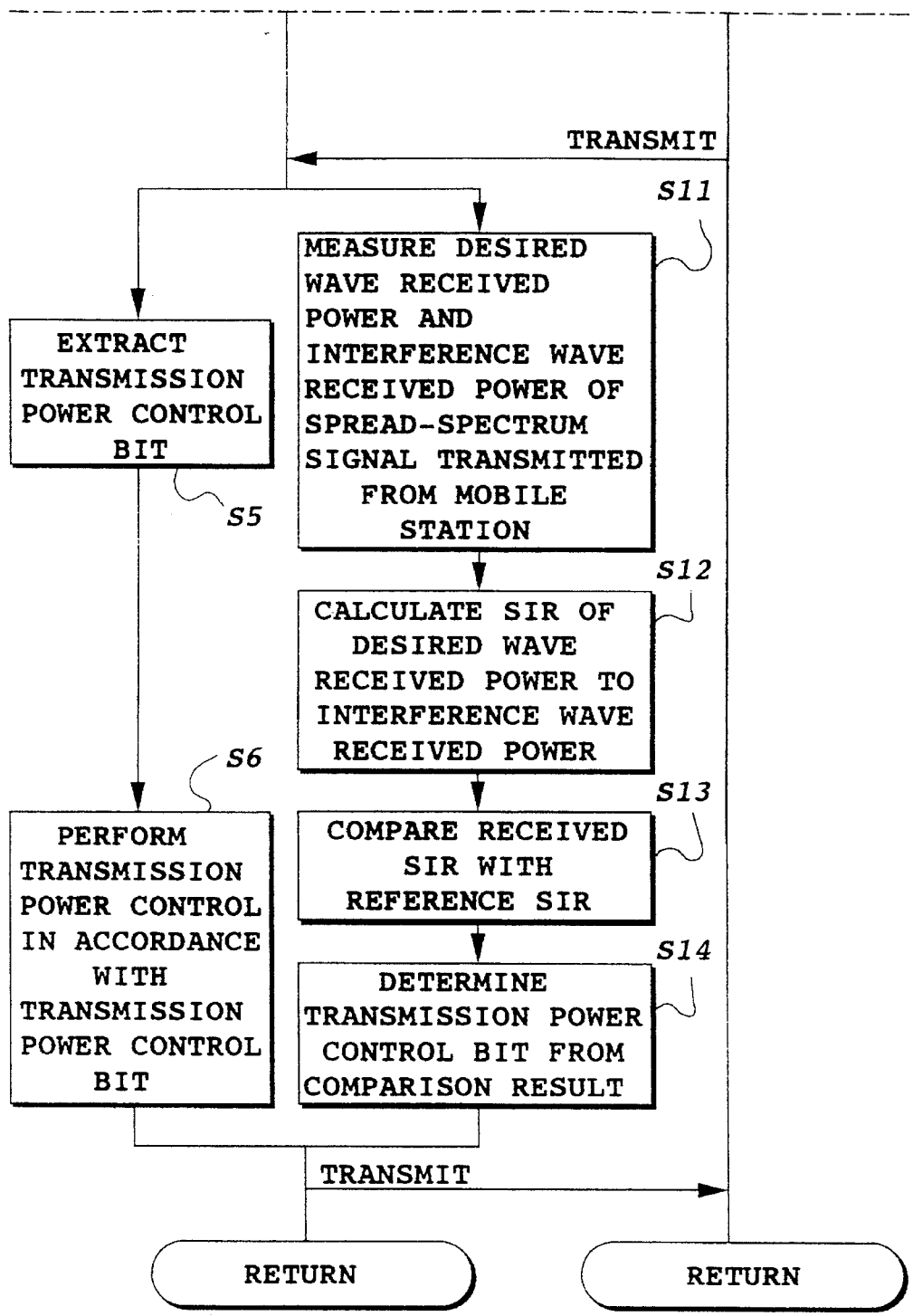
Figure 2B:
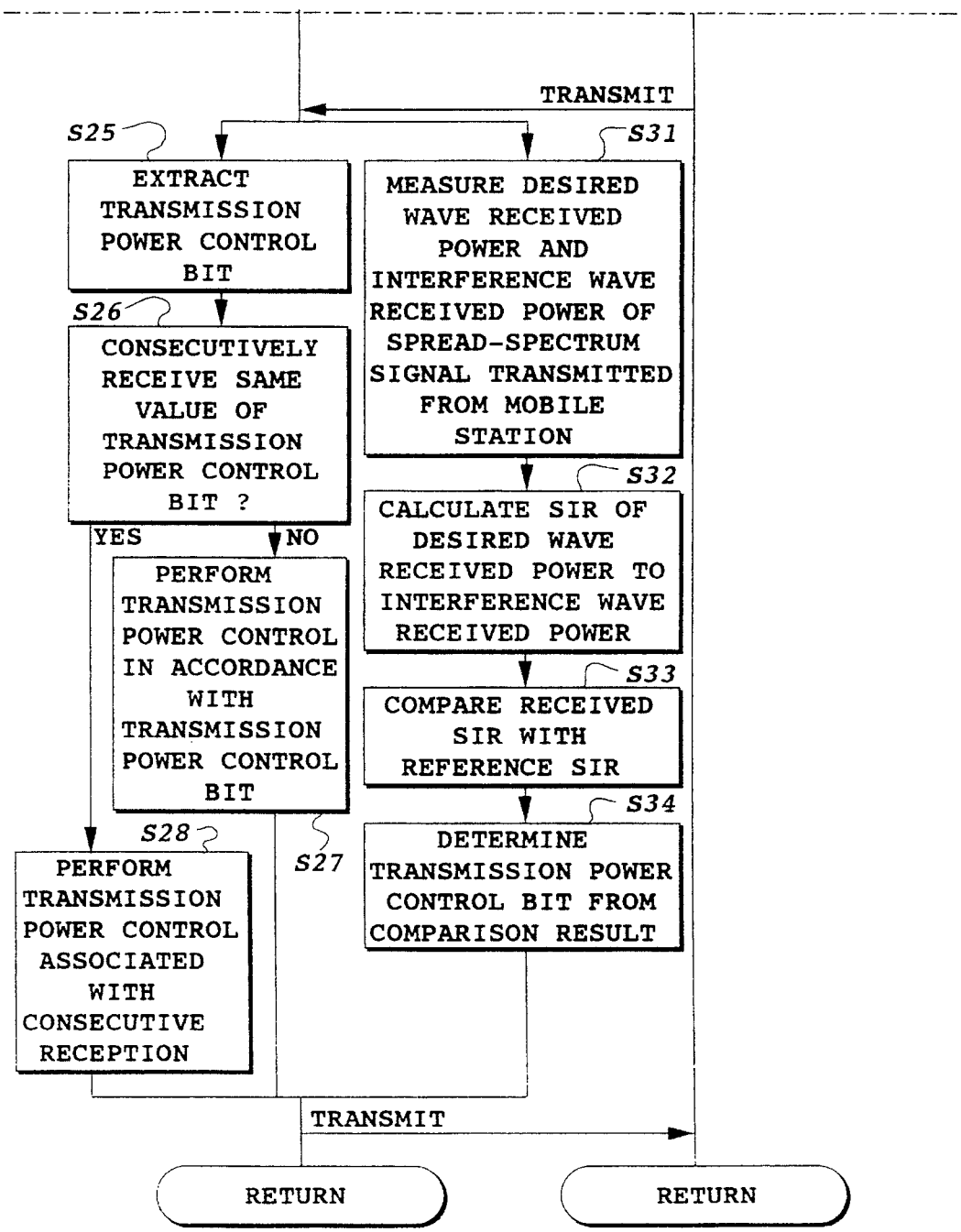

FIGS. 2A and 2B illustrate, in the form of a flowchart, the operation principle and control procedure of the present invention.

First, referring to FIGS. 2A and 2B, the transmission power control in the forward direction will be described. While a mobile station communicates with the base station in the cell, the mobile station measures the received SIR, and compares the measured result with a predetermined threshold, that is, with a reference SIR (steps S21–S23). If the measured result is greater than the reference SIR, the mobile station transmits a transmission power control bit which commands the base station to reduce its transmission power. On the contrary, if the measured result is less than the reference SIR, the mobile station transmits a transmission power control bit which commands the base station to increase its transmission power (step S24). The transmission power control bit is inserted into an information signal in a reverse frame, and is transmitted to the base station.

The base station, receiving the signal transmitted from the mobile station, despreads and demodulates the signal, extracts the transmission power control bits from the signal sequence (step S25), and determines the transmission power in accordance with the command of the transmission power control bits (step S24, see, Table 1). If the same value of the transmission power control bit is consecutively received (YES of step S26), the transmission power control is performed in accordance with control quantities of the transmission power (see, Table 2), which are predetermined in accordance with the number of consecutive receptions of the same value of the transmission power control bits (step S28).

TABLE 1

| TRANSMISSION POWER CONTROL BIT | TRANSMISSION POWER CONTROL AMOUNT |
| --- | --- |
| 0 | −1 dB |
| 1 | +1 dB |

TABLE 2

| CONSECUTIVE NUMBER OF "0" BITS | TRANSMISSION POWER CONTROL AMOUNT |
| --- | --- |
| 2 | −1 dB (NORMAL) |
| 3 | −3 dB |
| 4 | −4 dB |
| 5 OR MORE | −5 dB |

"1" BITS COMMAND +1 dB INDEPENDENTLY OF THE NUMBER OF CONSECUTIVE BITS

Next, the transmission power control in the reverse direction will be described. The base station measures the received SIR, and determines the transmission power control bit for controlling the transmission power of the mobile station on the basis of the measured result (steps S31–S34). Then, the base station inserts the transmission power control bit into a transmitted signal, and sends it to the mobile station. The mobile station, receiving the signal transmitted from the base station, despreads and demodulates the signal, extracts the transmission power control bit from the signal sequence (step S35), and determines the transmission power in accordance with the command of the transmission power control bit (step S37, see, Table 1). If the same value of the transmission power control bits is consecutively received, the transmission power control is performed in accordance with control quantities of the transmission power, which are predetermined in accordance with the number of consecutive receptions of the same value of the transmission power control bits (see, Table 2).

Thus, the transmission power control bit consists of one bit in this embodiment, and the normal transmission power control quantity is determined in accordance with Table 1. However, the transmission power control quantities are changed as shown in Table 2, when the same value of the transmission power control bits is received successively.

Figure 3:
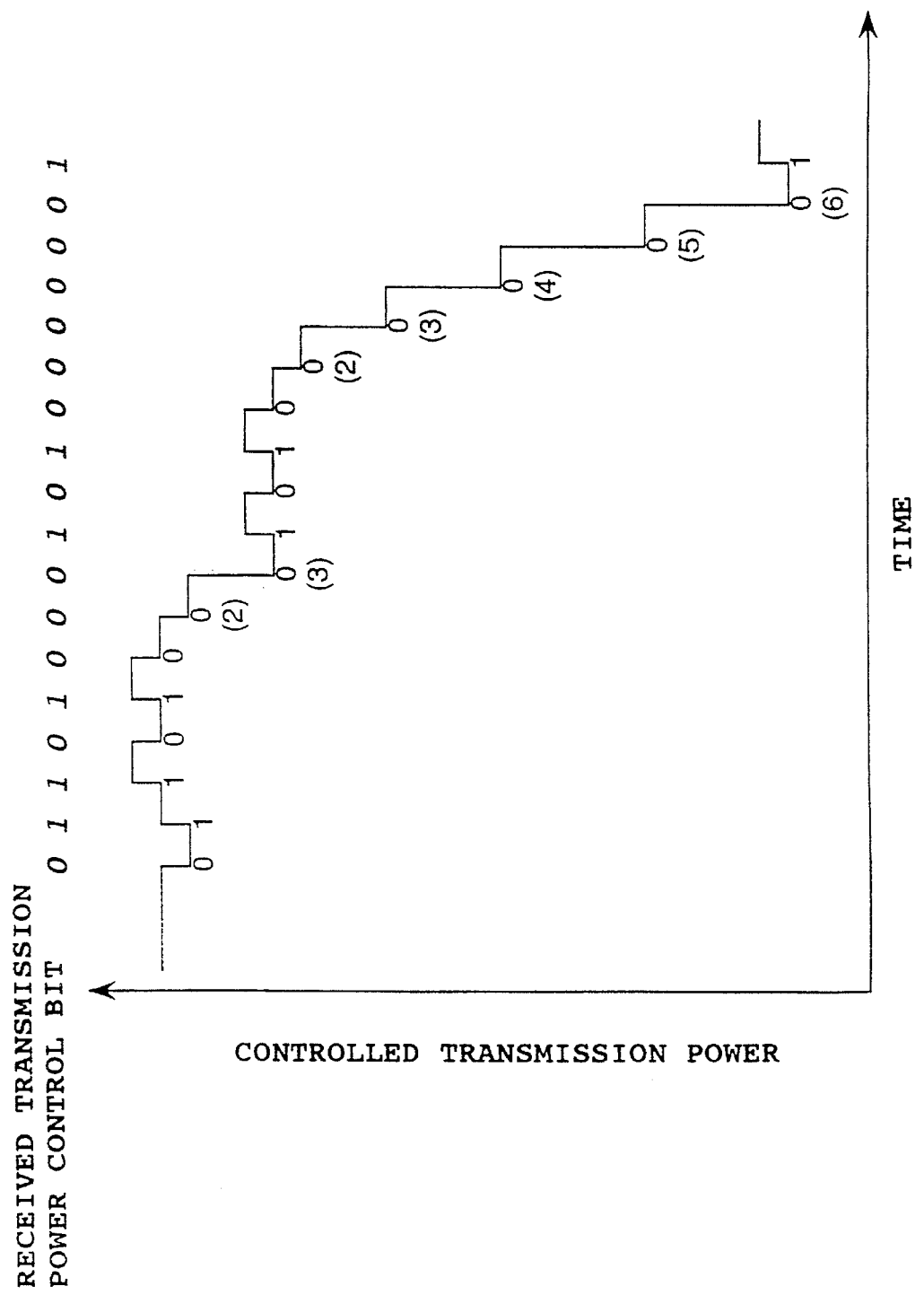
FIG. 3 is a diagram illustrating controlled quantities of transmission power during consecutive receptions of the same value of the transmission power control bits.

For example, when a transmission power control bit train as shown at the top of FIG. 3 is received, the transmission power control is carried out as shown in this figure. In this case, the normal transmission power control is performed even if the transmission power control bit "1" is received consecutively. The consecutive "0"s at the last portion of the transmission power control bit train will provide −3 dB at three consecutive bits, −4 dB at four consecutive bits, −5 dB at five consecutive bits, and −5 dB at six consecutive bits. Thus, the transmission power is substantially reduced in a short time.

Therefore, when the mobile station suddenly comes out of the shadow of a building, and the received power increases quickly, the transmission power is reduced by 19 dB in six transmission power control periods. This makes it possible to follow sudden changes in the communication paths.

Figure 4:
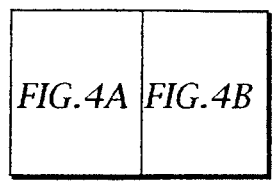
FIGS. 4, 4A and 4B are block diagrams showing an embodiment of a spread-spectrum communication system in accordance with the present invention.
Figure 4A:
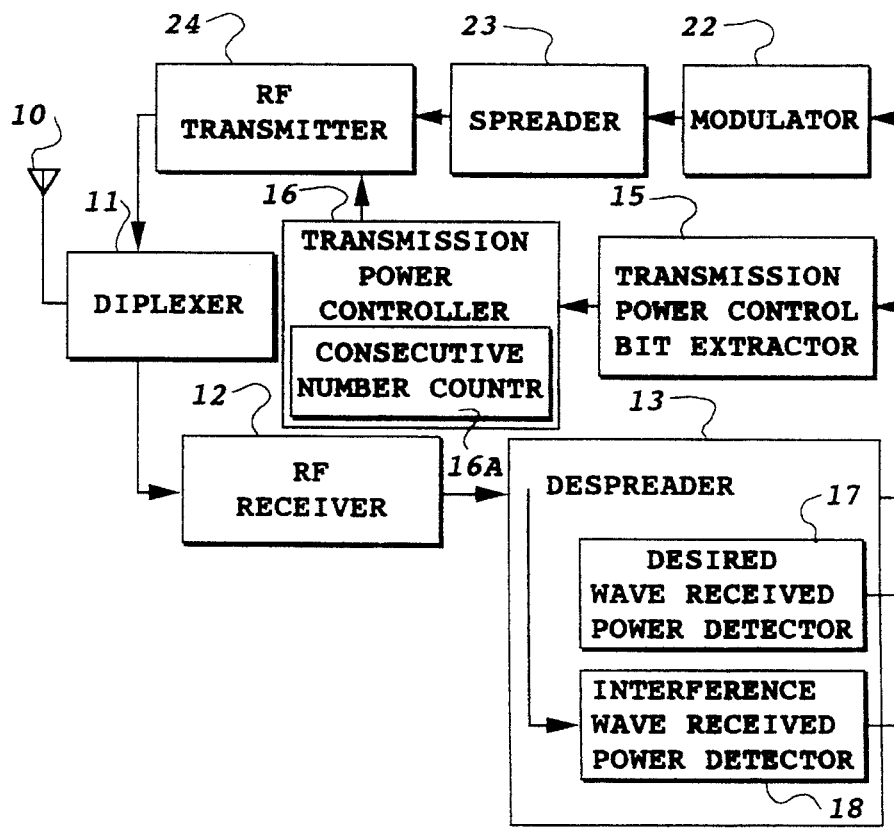
Figure 4B:
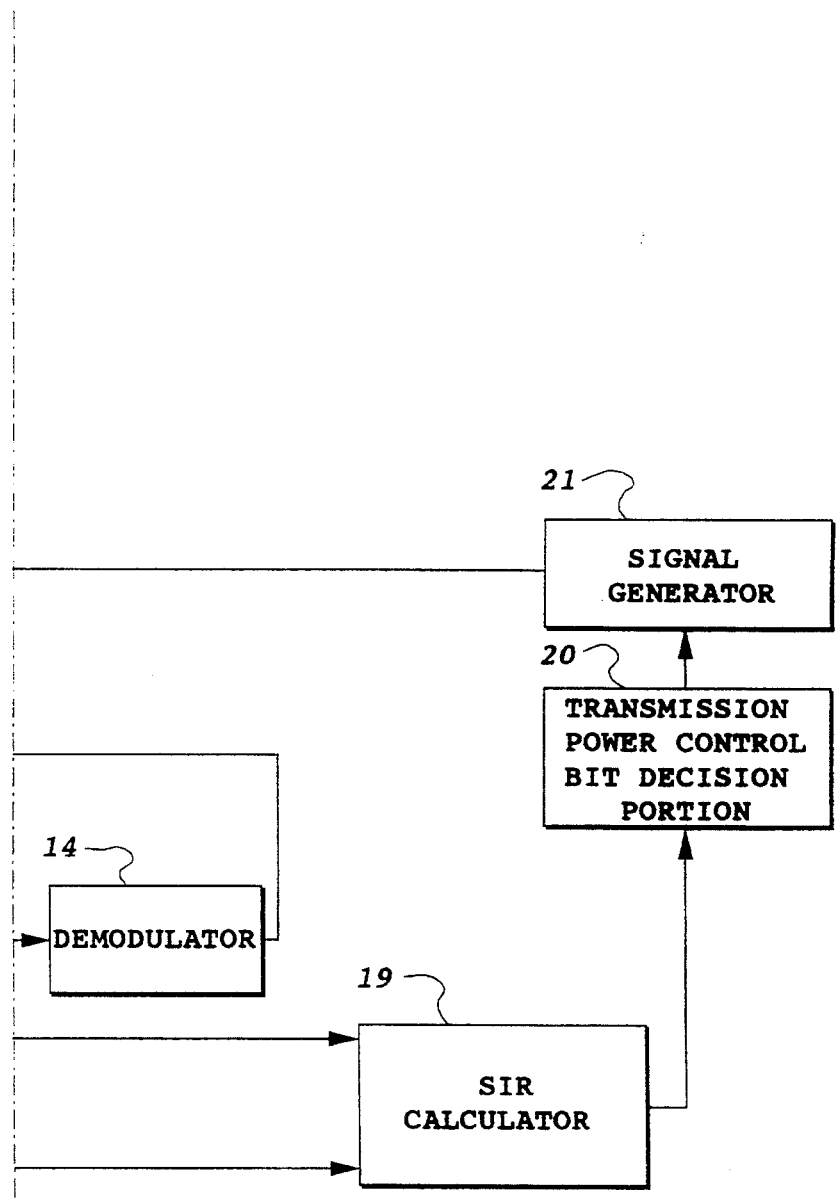

FIGS. 4A and 4B are block diagrams showing an embodiment of a spread-spectrum communication system in accordance with the present invention. In FIGS. 4A and 4B, the reference numeral 10 designates an antenna, the reference numeral 11 designates a diplexer, the reference numeral 12 designates an RF receiver, the reference numeral 13 designates a despreader, the reference numeral 14 designates a demodulator, the reference numeral 15 designates a transmission power control bit extractor, the reference numeral 16 designates a transmission power controller, the reference numeral 17 designates a desired wave received power detector, the reference numeral 18 designates an interference wave received power detector, the reference numeral 19 designates an SIR calculator, the reference numeral 20 designates a transmission power control bit decision portion, the reference numeral 21 designates a signal generator, the reference numeral 22 designates a modulator, the reference numeral 23 designates a spreader, and the reference numeral 24 designates an RF transmitter.

Next, the operation of the embodiment will be described assuming that the system of FIGS. 4A and 4B is a mobile station. A spread-spectrum signal transmitted from a base station is received by the antenna 10. The received signal is inputted to the RF receiver 12 via the diplexer 11. In the RF receiver 12, the received signal is passed through a bandpass filter to remove components out of the pass band, amplified by an amplifier, and down-converted to an intermediate frequency (IF) signal by a local signal generated by a local oscillator. The IF signal is passed through a bandpass filter, and its level is corrected to an appropriate signal level by an automatic gain control circuit (AGC). The output of the AGC undergoes a quasi-coherent detection, and is frequency-converted into a baseband signal. The baseband signal is passed though a lowpass filter, undergoes an analog-to-digital (A/D) conversion, and is outputted as a digital signal.

The digital signal outputted from the RF receiver 12 is despread by the despreader 13, and is outputted as a narrow band modulated signal. The modulated signal is demodulated by the demodulator 14. The demodulated signal is supplied to the transmission power control bit extractor 15 which extracts a transmission power control bit from the demodulated signal. The transmission power controller 16 is provided with a consecutive number counter 16A which counts the consecutive number by counting up its value when the extracted transmission power control bit is identical to the preceding one. Thus, the number of consecutive identical transmission power control bits is detected. In addition, the transmission power controller 16 determines the transmission power control quantity associated with the value of the transmission power control bits and their consecutive number as shown in Table 2, and provides the RF transmitter 24 with control information. Control tables corresponding to Tables 1 and 2 are stored in a ROM in the transmission power controller 16.

On the other hand, the desired wave received power detector 17 and the interference wave received power detector 18 in the despreader 13 detect the desired wave received power and the interference wave received power, respectively, on the basis of which the SIR calculator 19 obtains the received SIR. The transmission power control bit decision portion 20 compares the received SIR with a predetermined reference SIR, produces a control bit which commands an increase in the transmission power of the base station when the received SIR is less than the reference SIR, or a decrease in the transmission power when the received SIR is greater than the reference SIR, and supplies the control bit to the signal generator 21.

The signal generator 21 forms a frame to be transmitted including the transmission power control bit supplied from the transmission power control bit decision portion 20, and provides it to the modulator 22. The signal to be transmitted is modulated by the modulator 22, despread by the despreader 23, and is supplied to the RF transmitter 24. The transmitted signal which is frequency converted to an RF band by the RF transmitter 24 is transmitted at transmission power based on the control information outputted from the transmission power controller 16.

Although it is assumed that the system of FIGS. 4A and 4B is a mobile station, the system can be a base station which operates in a similar way.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A transmission power control method which controls transmission power of a transmitting station by using a transmission power control bit sequentially sent from a receiving station to the transmitting station, said transmission power control method comprising the steps of:

storing in advance, at said transmitting station, control quantities of said transmission power of said transmitting station, which are predetermined in accordance with the number of consecutive receptions of the same value of said transmission power control bit;

sending said transmission power control bit sequentially from said receiving station to said transmitting station;

detecting, at said transmitting station, the number of consecutive receptions of the same value of said transmission power control bit sent from said receiving station; and controlling, at said transmitting station, said transmission power in accordance with the stored control quantities associated with said number of consecutive receptions of the same value of said transmission power control bit.

2. The transmission power control method as claimed in claim 1, wherein said step of sending said transmission power control bit comprises the steps of:

detecting, at said receiving station, received power of a desired wave transmitted from the transmitting station;

detecting, at said receiving station, received power of an interference wave transmitted from the transmitting station;

calculating, at said receiving station, a received SIR (Signal-to-Interference Ratio) from said received power of the desired wave and said received power of the interference wave; and determining, at said receiving station, said transmission power control bit such that said received SIR becomes equal to a predetermined reference SIR.

3. The transmission power control method as claimed in claim 1, wherein said control quantities are predetermined in accordance with said number of consecutive receptions when the value of said transmission power control bit is "0" which commands a decrement of said transmission power, and said control quantities are fixed when the value of said transmission power control bit is "1" which commands an increment of said transmission power.

4. The transmission power control method as claimed in claim 3, wherein said control quantities are −1 dB, −3 dB, −4 dB, and −5 dB, when the number of consecutive receptions of "0" of said transmission power control bit is 2, 3, 4, and 5 or more, respectively.

5. A spread-spectrum communication system which controls transmission power of a transmitting station by using a transmission power control bit sequentially sent from a receiving station to the transmitting station, said spread-spectrum communication system comprising:

means for storing in advance, at said transmitting station, control quantities of said transmission power of said transmitting station, which are predetermined in accordance with the number of consecutive receptions of the same value of said transmission power control bit;

means for sending said transmission power control bit sequentially from said receiving station to said transmitting station;

means for detecting, at said transmitting station, the number of consecutive receptions of the same value of said transmission power control bit kent from said receiving station; and means for controlling, at said transmitting station, said transmission power in accordance with the stored control quantities associated with said number of consecutive receptions of the same value of said transmission power control bit.

6. The spread-spectrum communication system as claimed in claim 5, wherein said means for sending comprises:

means for detecting, at said receiving station, received power of a desired wave transmitted from the transmitting station;

means for detecting, at said receiving station, received power of an interference wave transmitted from the transmitting station;

means for calculating, at said receiving station, a received SIR (Signal-to-Interference Ratio) from said received power of the desired wave and said received power of the interference wave; and means for determining, at said receiving station, said transmission power control bit such that said received SIR becomes equal to a predetermined reference SIR.

7. The spread-spectrum communication system as claimed in claim 5, wherein said control quantities are predetermined in accordance with said number of consecutive receptions when the value of said transmission power control bit is "0" which commands a decrement of said transmission power, and said control quantities are fixed when the value of said transmission power control bit is "1" which commands an increment of said transmission power.

8. The spread-spectrum communication system as claimed in claim 7, wherein said control quantities are −1 dB, −3 dB, −4 dB, and −5 dB, when the number of consecutive receptions of "0" of said transmission power control bit is 2, 3, 4, and 5 or more, respectively.

\* \* \* \* \*